US006098652A

United States Patent [19]

Brandt

[11] Patent Number: 6,098,652

[45] Date of Patent: Aug. 8, 2000

[54] QUICK CONNECT FUEL FILTER AND REGULATOR

[75] Inventor: Timothy B. Brandt, West Des Moines, Iowa

[73] Assignee: Parr Manufacturing, Inc., Des Moines, Iowa

[21] Appl. No.: 09/235,033

[22] Filed: Jan. 21, 1999

[51] Int. Cl.[7] .................... F16K 43/00

[52] U.S. Cl. .................... 137/315.05; 29/450; 29/453; 137/115.27; 137/508; 137/510; 137/549; 210/130; 210/137; 210/429; 210/443; 251/367; 285/319; 285/321; 285/921

[58] Field of Search .................... 137/115.27, 315.04, 137/315.05, 508, 510, 549; 123/456, 467, 510, 514; 210/130, 137, 416.4, 429, 443; 251/367; 285/319, 321, 348, 921; 29/428, 446, 450, 453

[56] References Cited

U.S. PATENT DOCUMENTS

| | | | |
|---|---|---|---|
| 4,254,938 | 3/1981 | Inada et al. | 251/367 |
| 4,541,658 | 9/1985 | Bartholomew | 285/319 |
| 4,601,497 | 7/1986 | Bartholomew | 285/319 |
| 4,936,544 | 6/1990 | Bartholomew | 251/149.6 |
| 4,948,176 | 8/1990 | Bartholomew | 285/319 |
| 5,078,167 | 1/1992 | Brandt et al. | 137/549 |
| 5,402,817 | 4/1995 | Bueser | 137/549 |
| 5,533,478 | 7/1996 | Robinson | 137/549 |
| 5,584,318 | 12/1996 | Brandt | 137/549 |
| 5,782,508 | 7/1998 | Bartholomew | 285/319 |

*Primary Examiner*—George L. Walton
*Attorney, Agent, or Firm*—Henderson & Sturm LLP

[57] ABSTRACT

A modular pressure regulator/filter wherein the fuel filter is adapted to be attached to a fuel delivery system of an internal combustion engine and the housing thereof has a projecting wall on the filter housing adjacent to a female opening in the fuel filter housing. This projecting wall has at least one slot therein. A clip is provided and includes a disc portion with a central opening therein for selectively receiving a male outlet conduit from the pressure regulator. A clip projection, which is integral with and movably attached to the disc portion, is adapted to be selectively received into the slot in the projecting wall whereby the clip is held from moving away from the projecting wall. An annular projection on the pressure regulator housing is disposed between the disc portion and the clip projection when the clip projection is in the first position thereof for holding the pressure regulator housing in the clip. The clip therefore is used to selectively hold the pressure regulator housing and the filter housing together or allow them to be quickly and easily separated.

5 Claims, 3 Drawing Sheets

QUICK CONNECT FUEL FILTER AND REGULATOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a combination fuel filter and regulator and more particularly to one which has a fuel filter and regulator which can easily and quickly be separated to replace one or the other without replacing the entire unit.

2. Description of the Related Art

U.S. Pat. Nos. 5,078,167; 5,649,561; and 5,584,318 to Brandt, and which are incorporated herein by reference, show combination fuel filter and fuel regulator units. The '318 patent discloses a modular fuel filter and pressure regulator apparatus which permits the filter element to be replaced separately from the regulator or vice versa, whereas the other two aforementioned patents require that the entire filter/regulator be replaced whenever one or the other needs to be replaced. It has been determined that there is a need for a modular fuel filter and pressure regulator which can be separated more easily and quickly than has heretofore been possible with prior art devices.

BRIEF SUMMARY OF THE INVENTION

The present invention relates to a modular pressure regulator/filter. The fuel filter/regulator is adapted to be attached to a fuel delivery system of an internal combustion engine and the housing thereof has a projecting wall connected to the filter housing adjacent to a female opening in the fuel filter housing. This projecting wall has at least one slot therein. A clip is provided and includes a disc portion with a central opening therein for selectively receiving a male outlet conduit from the pressure regulator. There is a clip projection which is integral with and movably attached to the disc portion and is adapted to be selectively received into the slot in the projecting wall whereby the clip is held from moving away from the projecting wall. An annular projection on the pressure regulator housing is disposed between the disc portion and the clip projection when the clip projection is in the first position thereof for holding the pressure regulator housing in the clip. The clip therefore is used to selectively hold the pressure regulator housing and the filter housing together or allow them to be quickly and easily separated.

An object of the present invention is to provide a combination filter and regulator having a quickly changeable and modular filter and changeable modular regulator.

Another object of the present invention is to provide a simple and inexpensive way to change the filter on a combination filter/regulator.

A still further object of the present invention is to provide a way to change the pressure regulator without changing the filter.

Another object of the present invention is to make a combination fuel filter and regulator which requires a minimum labor cost to change out either part.

Other objects, advantages, and novel features of the present invention will become apparent from the following detailed description of the invention when considered in conjunction with the accompanying drawings.

DETAILED DESCRIPTION OF THE INVENTION

Figure 1:
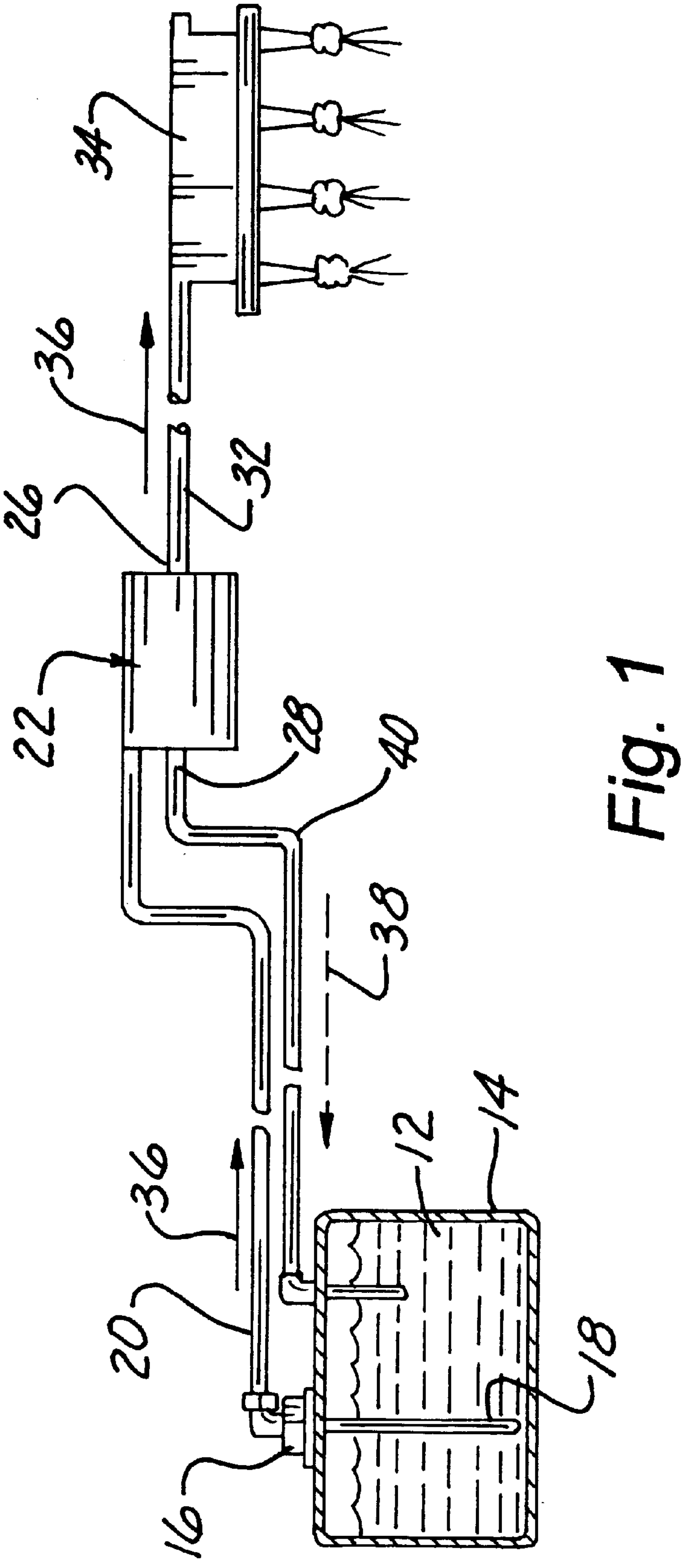
FIG. 1 is a schematic illustration of a typical fuel supply system for a vehicle with an internal combustion engine therein utilizing the present invention.

Referring now to the drawings, wherein like reference numerals designate identical or corresponding parts throughout the several views, FIG. 1 shows a schematic view of the present invention shown in a typical arrangement between the fuel tank and the fuel rail of an internal combustion engine (not shown). In a typical fuel delivery system of a vehicle, as illustrated in FIG. 1, the fuel delivery system includes a fuel tank (12) with liquid fuel (14) therein, a fuel pump (16), typically electrically operated, constantly draws fuel (14) through the pump inlet (18) disposed within the tank (12). The fuel (14) is forced under pressure through the pump outlet (20) where it enters the fuel filter/regulator housing (22).

Figure 2:
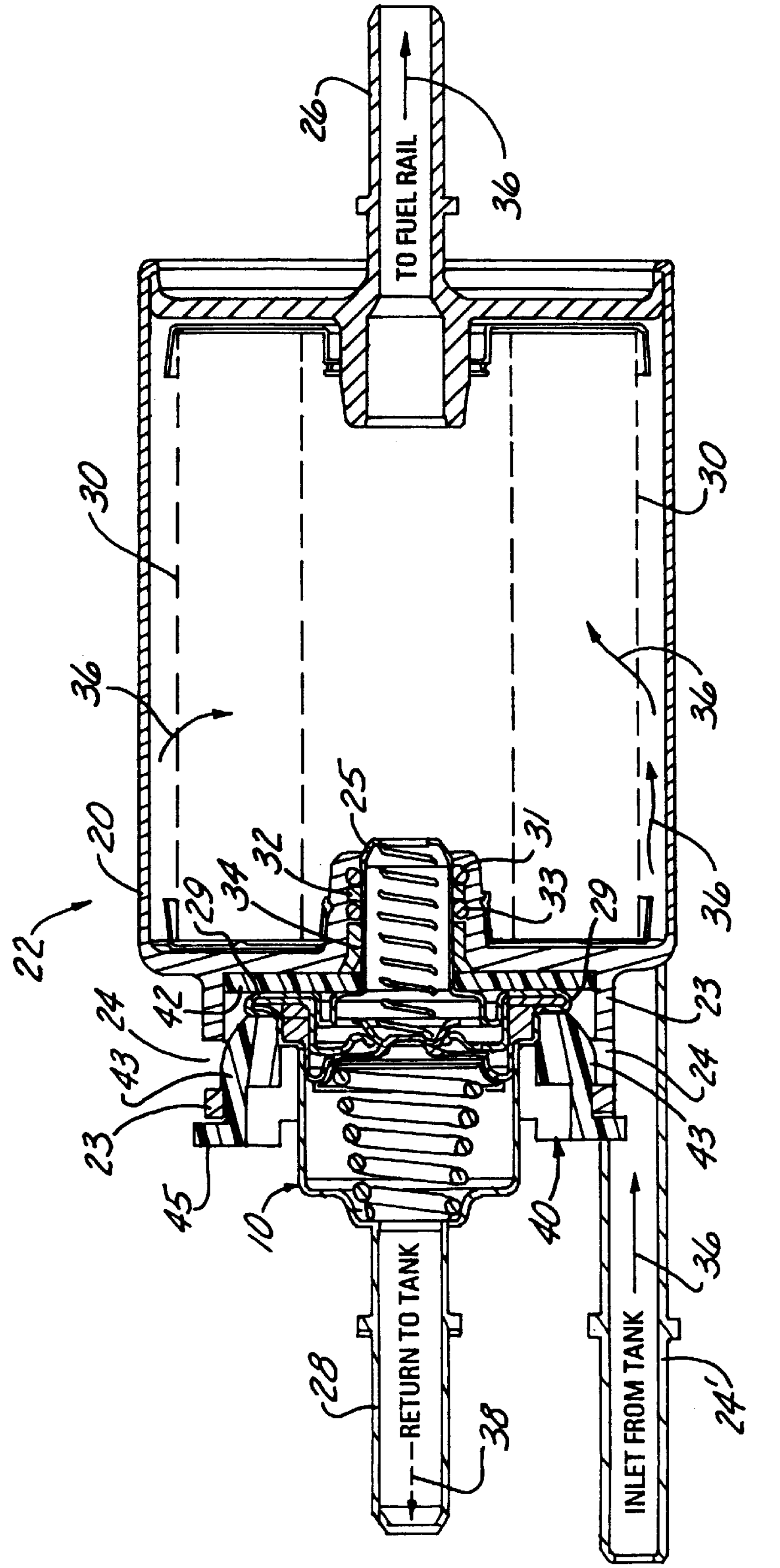
FIG. 2 is a cross-sectional view of the present invention showing a combination modular fuel regulator and fuel filter with a quick disconnect structure for connecting or disconnecting the regulator and the filter.

Referring now to FIG. 2, the fuel pressure regulator (10) is shown disposed within the fuel filter/regulator combination (22) which includes a fuel supply port (24), a fuel outlet port (26) and a fuel return port (28). A fuel filter (30) is retained within the fuel filter/regulator housing (22) for filtering particular contaminants from the fuel (14). When the fuel (14) enters the fuel filter/regulator housing (22) through supply port (24), the fuel is forced through the fuel filter (30) and out through the outlet port (26) that is connected to a fuel line (32) leading to a fuel metering device (34) such as a carburetor or fuel injectors for supplying fuel to the vehicle engine (not shown). Due to the fuel pump (16) constantly pumping fuel into the system at flow rates usually higher than what is required by the engine, the fuel pressure regulator (10) acts to regulate the pressure in the fuel line (32) by opening and closing at predetermined pressure levels to keep the pressure fuel line (32) relatively constant within tolerances. The fuel delivery system is shown in FIGS. 1 and 2 with the solid arrow lines (36) indicating the fuel flow when the pressure regulator is in the closed position and the dashed arrow lines (38) indicating the fuel flow when the pressure regulator (10) is in an open position. In FIG. 1 it can be seen that when the pressure regulator (10) is in the open position, the fuel (14) passes through the regulator (10) and out through the return port (28) where it is returned to the fuel tank (12) by the return line (40). The way that the pressure regulator (10) operates is shown and explained in detail in U.S. patent application Ser. No. 09/107,255 to Brandt et al filed Jul. 1, 1998, now U.S. Pat. No. 6,006,781, which is incorporated herein by reference. The pressure regulator (10) could of course be of a different construction for the purposes of the present invention because it is only how the pressure regulator (10) is connected or disconnected from the fuel filter housing that is important to the instant invention.

Figures 3, 4, 5:
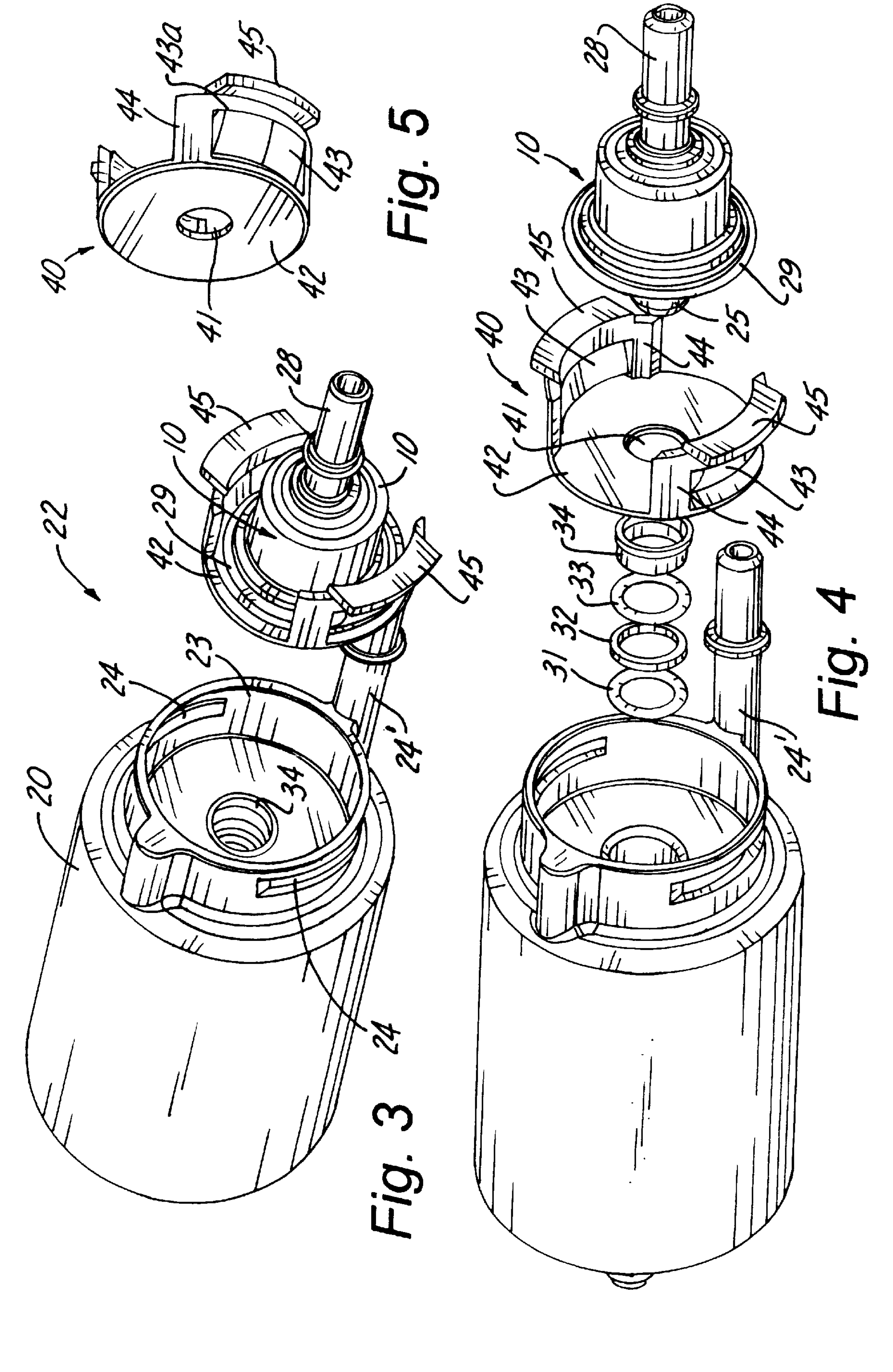
FIG. 3 is a perspective exploded view of the present invention showing the regulator and clip separated from the filter.
FIG. 4 is another perspective and more exploded view of the present invention.
FIG. 5 is a view of a connecting clip for connecting the regulator to the filter housing from another view than that shown in FIG. 4.

As shown in FIGS. 2, 3 and 4, the fuel filter housing (20) has a projecting annular wall (23) with a pair of slots (24) disposed therein. Referring to FIG. 4, the pressure regulator (10) has a male inlet conduit (25) therein which extends through an opening (41) in a disc (42) of the clip (40). This clip (40) also has a pair of clip projections (43) thereon which are inwardly formed by plastic molding of the clip (40) in one piece. Clip (40) has upstanding portions (44) and radially extending portions (45). When the radially extending portions (45) are squeezed together, for example manually between the thumb and forefinger, the clip projections (43) will move inwardly as well.

To assemble the combination regulator/filter to the position shown in FIG. 2, first the pressure regulator (10) shown in FIG. 4 is pushed into the clip (40) to the position shown in FIGS. 2 and 3. When this occurs, the bottom of clip projection (43) will hold an annular projection (29) between the disc (42) of the clip (40) and the projections (43) of the clip (40).

Referring again to FIG. 4, a stuffer pin assembly (31), (32), (33) and (34) is placed inside of part (35) of housing (20) as can best be seen in FIG. 2. These are essentially seals to cause the flow to go inside the conduit (25) instead of leaking past the stuffer pin seals (31–34).

So after the parts are assembled to the point shown in FIG. 3, then the clip (40) and pressure regulator (10) are moved into the position shown in FIG. 2 wherein a top shoulder **(43*a*) on the clip projection (43) moves into the slot (24) of annular shoulder (23) and thereby holds the pressure regulator (10) in place as shown in FIG. 2**.

When it is desired to replace either the filter (20) or the fuel regulator (10), the radially outwardly extending portions (45) of the clip are then squeezed radially inwardly until the shoulder **(43*a*) of clip projections (43) are moved inside of the annular shoulder (23) and out of the slots (24) therein. Then the fuel regulator (10) and clip (40) can be moved back to the position shown in FIG. 3. Once in this position then the filter (20) can be replaced if that is the part that needs to be replaced or, alternatively, the pressure regulator (10) can be replaced, it being possible to save the clip (40) if desired, by moving the clip projections (43) outwardly and pulling the pressure regulator out of the clip (40)**.

Accordingly, it will be appreciated that the present invention does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. Apparatus comprising:

a pressure regulator having a regulator housing, said regulator housing having an annular projection thereon, said pressure regulator housing also having an outlet and a male inlet conduit thereon, said male inlet conduit including a tubular portion;

a fuel filter disposed in a filter housing, said fuel filter being adapted to be operably attached to a fuel delivery system of an internal combustion engine, said fuel filter having a female opening therein for receiving said male inlet conduit of the pressure regulator housing;

a projecting wall connected to the filter housing adjacent said female opening in the fuel filter housing, said projecting wall having at least one slot therein; and a clip, said clip including a disc portion having a central opening therein for selectively receiving said male inlet conduit therethrough, a clip projection integral with and moveably attached to said disc portion and adapted to be selectively received into the slot in said projecting wall in a first position thereof whereby the clip is held from moving away from said projecting wall, said annular projection of the pressure regulator housing being disposed between the disc portion and the clip projection when the clip projection is in the first position thereof for holding the pressure regulator housing in said clip, whereby the clip is used to selectively hold the pressure regulator housing and the filter housing operatively together or allows said pressure regulator housing and filter housing to be quickly and easily separated.

2. The apparatus of claim 1 including a radially outwardly extending portion of the clip attached on one side of the clip projection closer to the pressure regulator housing than to the filter housing whereby moving the radially outwardly extending portion of the clip radially inwardly also moves the clip projection radially inwardly to a second position whereby it is no longer in the slot of the projecting wall of the filter housing.

3. The apparatus of claim 1 wherein said clip is constructed of a plastic material.

4. The apparatus of claim 3 wherein said clip is constructed of NYLON.

5. The apparatus of claim 1 wherein said projecting wall has a second slot therein and said clip has a second clip projection thereon, and wherein said second slot and second clip projection are constructed like and work like the first said slot in said projecting wall in relation to said first clip projection.

* * * * *